United States Patent
Chinzei et al.

(10) Patent No.: US 6,450,384 B1
(45) Date of Patent: Sep. 17, 2002

(54) CONTINUOUS PAPER TREATING APPARATUS AND TRACTOR

(75) Inventors: Kiyoshi Chinzei, Hyogo; Kenichirou Yano, Kanagawa, both of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/531,681

(22) Filed: Mar. 20, 2000

(30) Foreign Application Priority Data

Sep. 17, 1999 (JP) .......................................... 11-264595

(51) Int. Cl.⁷ .............................. G03B 1/28; G03B 1/30
(52) U.S. Cl. .............................. 226/59; 226/74; 226/83; 226/171
(58) Field of Search .............................. 226/59, 74, 75, 226/83, 171, 195

(56) References Cited

U.S. PATENT DOCUMENTS

| | | | | |
|---|---|---|---|---|
| 3,113,823 A | * | 12/1963 | Phillips ..................... 226/75 X |
| 3,669,327 A | * | 6/1972 | Dowd ........................ 226/74 X |
| 3,960,304 A | * | 6/1976 | Holland-Letz ............... 226/74 |
| 4,925,076 A | * | 5/1990 | Unuma ........................ 226/74 |
| 5,061,096 A | * | 10/1991 | Hauslaib et al. ........... 226/74 X |
| 5,181,641 A | * | 1/1993 | Ferguson ..................... 226/74 |
| 6,056,180 A | * | 5/2000 | Crowley et al. ......... 226/171 X |
| 6,176,411 B1 | * | 1/2001 | Suketomo ............... 226/195 X |

FOREIGN PATENT DOCUMENTS

| JP | 60-196376 | 10/1985 |
|---|---|---|
| JP | 3-161374 | 7/1991 |

* cited by examiner

*Primary Examiner*—Michael R. Mansen
(74) *Attorney, Agent, or Firm*—Armstrong, Westerman and Hattori, LLP (57) ABSTRACT

A continuous paper treating apparatus is provided which includes a tractor for feeding continuous paper and a paper treating unit for treating the paper. The tractor includes a driving belt provided with tractor pins, a tractor lid for covering the driving belt, a support base having a paper support surface for supporting the continuous paper. The tractor also includes a presser member supported by the tractor lid. The presser member is variable in position and posture relative to the tractor lid, and has a pressing surface for pressing the paper. In the tractor, use is made of springs for urging the presser member toward the paper supporting surface, so that the pressing surface presses the continuous paper onto the paper supporting surface.

11 Claims, 7 Drawing Sheets

CONTINUOUS PAPER TREATING APPARATUS AND TRACTOR

BACKGROUND OF THE INVENTION

1. Field of the Invention

The present invention relates to a continuous paper treating apparatus such as an electrophotographic printer used for printing desired images on continuous paper. The present invention also relates to a tractor which is incorporated in a continuous paper treating apparatus for transferring the continuous paper.

2. Description of the Related Art

Referring FIG. 8, the outline of a conventional electrophotographic printer will be described. As illustrated, the conventional printer includes two tractors 2, a photosensitive drum 12, a transfer unit 13, a fixing unit 19, a scuff roller 16 and a pinch roller 17.

The tractors 2, being spaced from each other widthwise of the paper P, are provided for transferring continuous paper P toward the photosensitive drum 12. One of the tractors 2 is arranged adjacent to a longitudinal edge of the paper P, while the other tractor is arranged adjacent to the other longitudinal edge of the paper. Each tractor 2 includes a tractor belt 21 provided with a plurality of tractor pins 22 (the tractor belt 21 may be replaceable with rollers). When the tractor belt 21 is driven, the tractor pins 22 will come into engagement, one after another, with indexing holes formed in the paper P along the longitudinal edge thereof.

For performing printing, electrostatic latent images are formed on the photosensitive drum 12 by an image forming unit 14. The latent images are developed by a developing unit 15 to produce visible toner images. The toner images are transferred onto the paper P by the transfer unit 13, and then fixed by the fixing unit 19. Thereafter, the paper P is moved forward (downstream of the transfer path) by the scuff roller 16 and the pinch roller 17.

To obtain high-quality printing results, the longitudinal paper P needs to be properly tensioned while it is being transferred toward the photosensitive drum 12. Conventionally, necessary tension may be exerted by causing the circumferential speed of the drum 12 to be slightly greater than the paper transfer speed by the tractors 2. In this way, the paper P tends to be pulled more toward the drum 12 than toward the tractors 2, whereby required tension is generated in the paper.

As stated above, the paper P is pulled downstream due to the different operational speeds of the drum 12 and tractors 2. It is known, however, that there is another factor to cause the paper P to be pulled downstream. Specifically, in transferring toner images from the drum 12 to the paper P, the paper P tends to stick to the drum 12. As a result, the paper P, being caught temporarily by the drum 12, will be dragged downstream to a greater extent than is expected only from the effect of the above-mentioned speed difference.

In view of the additional pulling force acting on the paper P, the conventional apparatus may be disadvantageous in the following respects.

When the pulling force generated due to the sticking of the paper P is small enough, the paper P will be properly transferred along the predetermined path. However, when the pulling force becomes unacceptably large (this may happen, for example, when the temperature and/or humidity of the surface of the drum 12 are low), the paper P may unduly come off the tractor pins 22 of the tractors 2 or even be torn at the indexing holes of the paper P.

Figure 8:
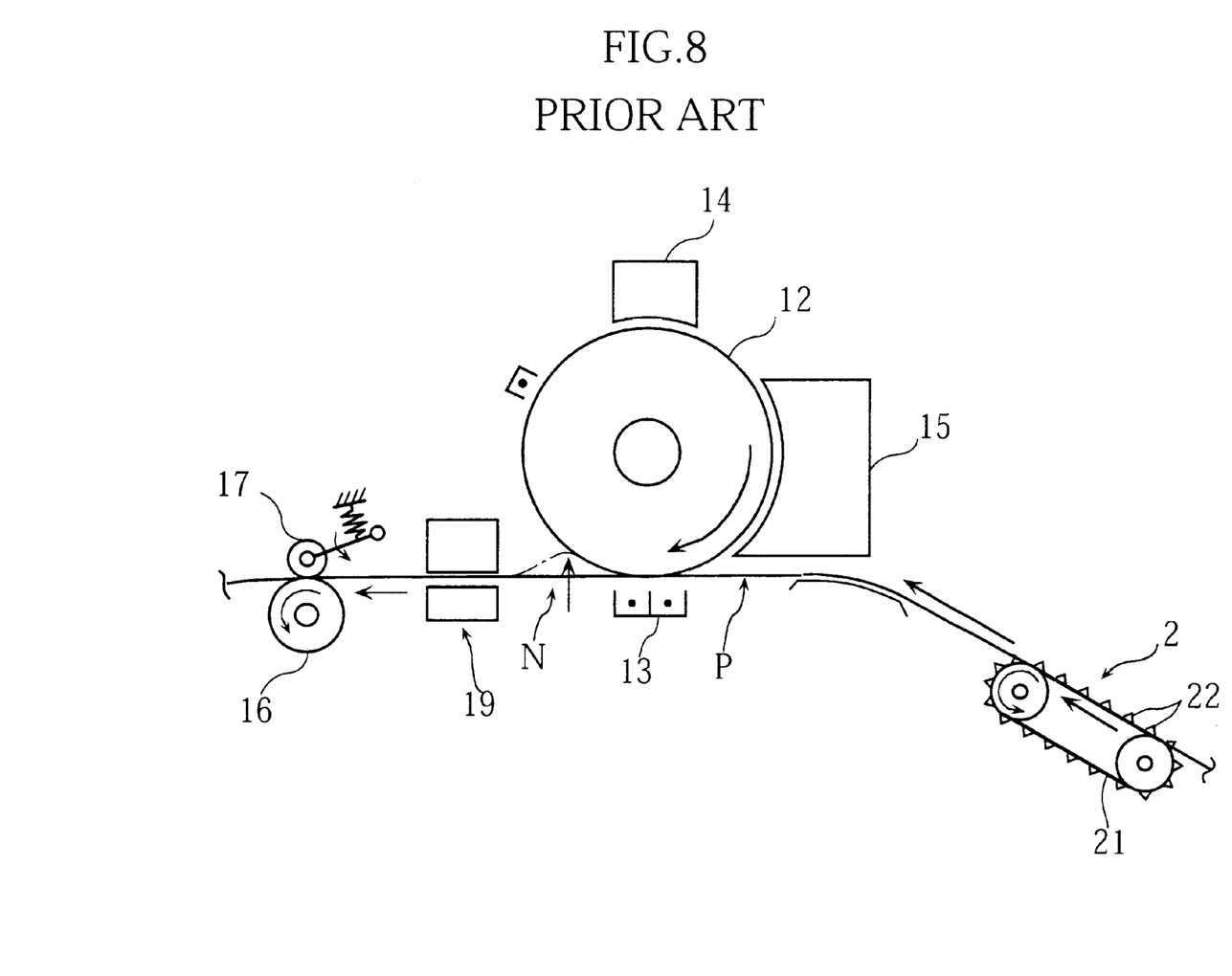
FIG. 8 illustrates the outline of a conventional apparatus.

What makes the matters worse is that the paper P can adhere to the drum surface not only when the toner images are transferred to the paper P, but also after the paper P is moved downstream from the drum 12 (see an arrow N shown in FIG. 8). Such a phenomenon is often observed when the rotational speed of the drum 12 is increased, or when the thickness of the paper P is reduced. If this happens, the paper P will be pulled downstream much more strongly, which is clearly disadvantageous for performing proper printing.

Another type of conventional printer (not shown) may include two or more photosensitive drums for performing printing on both sides of continuous paper. In this printer, continuous paper may disadvantageously be pulled more forcibly by the plural photosensitive drums during a printing operation.

For addressing the problem of premature disengagement of the paper, conventionally use has been made of e.g. a tractor lid arranged above a tractor belt. However, the conventional tractor lid is configured to allow the presence of a clearance between the lid and the paper, thereby failing to prevent the premature disengagement of the paper. Also, the conventional lid cannot serve as effective countermeasures against the breakage of the paper.

SUMMARY OF THE INVENTION

The present invention has been proposed under the circumstances described above, and its object is to provide effective means for properly transferring continuous paper without causing the paper to be torn at indexing holes or to unduly come off paper tractors.

According to a first aspect of the present invention, there is provided a continuous paper treating apparatus comprising:

a tractor including a rotatable driving member provided with a plurality of tractor pins, the tractor also including a tractor lid for covering the driving member; and treating means for treating continuous paper transferred along a predetermined path by the tractor;

wherein the tractor further includes a support member having a paper support surface for supporting the continuous paper, the tractor further including a presser member supported by the tractor lid in a manner such that the presser member is variable in position and posture relative to the tractor lid, the presser member having a pressing surface for pressing the continuous paper, the tractor further including urging means for urging the presser member toward the paper supporting surface so as to cause the pressing surface to press the continuous paper onto the paper supporting surface.

According to a preferred embodiment of the present invention, the urging means may be an elastic member such as a spring. In place of the spring, a rubber member may be used.

With the above arrangement, continuous paper (on the way to the treating means from the tractor) is pressed onto the paper supporting surface by the presser member. In this manner, a suitable frictional force is advantageously applied to the paper for balancing out unfavorable pulling force exerted by the treating means. As a result, it is possible to prevent the continuous paper from being torn at the indexing holes or unduly coming off the tractor.

Further, according to the present invention, the continuous paper is suitably held between the pressing surface of the presser member and the paper supporting surface. In this way, the paper is prevented from deviating from the predetermined paper transfer path, so that the tractor pins will be properly engaged with the indexing holes of the paper.

Still further, since the presser member is variable in position and posture relative to the tractor lid, the entirety of the pressing surface of the presser member can be brought into contact with the paper. Thus, desired frictional force is reliably applied to the paper.

Preferably, the tractor lid may be movable to be selectively brought into facing relation to the paper supporting surface. Further, the tractor lid may be urged toward the paper supporting surface with a first urging force, while the presser member may be urged toward the paper supporting surface with a second urging force which is greater than the first urging force.

With such an arrangement, not only the presser member but also the tractor lid prevents the continuous paper from unduly coming off the tractor Preferably, the tractor lid may be movable into facing relation to the paper supporting surface, and this facing relation may cause the tractor lid and the paper supporting surface to define a clearance when the continuous paper is unsupported by the paper supporting surface.

With such an arrangement, the continuous paper is easily inserted between the tractor lid and the paper supporting surface.

Preferably, the driving member may comprise a tractor belt from which the tractor pins protrude. Advantageously, at least two of the tractor pins may be present upstream of the paper transfer path from the presser member.

Preferably, the presser member may be provided with a chamfered portion defining a paper inlet opening for inserting the continuous paper between the pressing surface and the paper supporting surface.

According to a second aspect of the present invention, there is provided a tractor for transferring continuous paper comprising:

a rotatable driving member provided with a plurality of tractor pins;

a tractor lid for covering the driving member;

a support member having a paper support surface for supporting the continuous paper;

a presser member supported by the tractor lid in a manner such that the presser member is variable in position and posture relative to the tractor lid, the presser member having a pressing surface for pressing the continuous paper; and urging means for urging the presser member toward the paper supporting surface so as to cause the pressing surface to press the continuous paper onto the paper supporting surface.

The tractor of the present invention may advantageously be incorporated in a continuous paper treating apparatus, such as an electrophotographic printer, for transferring continuous paper.

Other features and advantages of the present invention will become apparent from the detailed description given below with reference to the accompanying drawings.

DETAILED DESCRIPTION OF THE PREFERRED EMBODIMENTS

The preferred embodiment of the present invention will be described below with reference to FIGS. 1–7 of the accompanying drawings.

Figure 1:
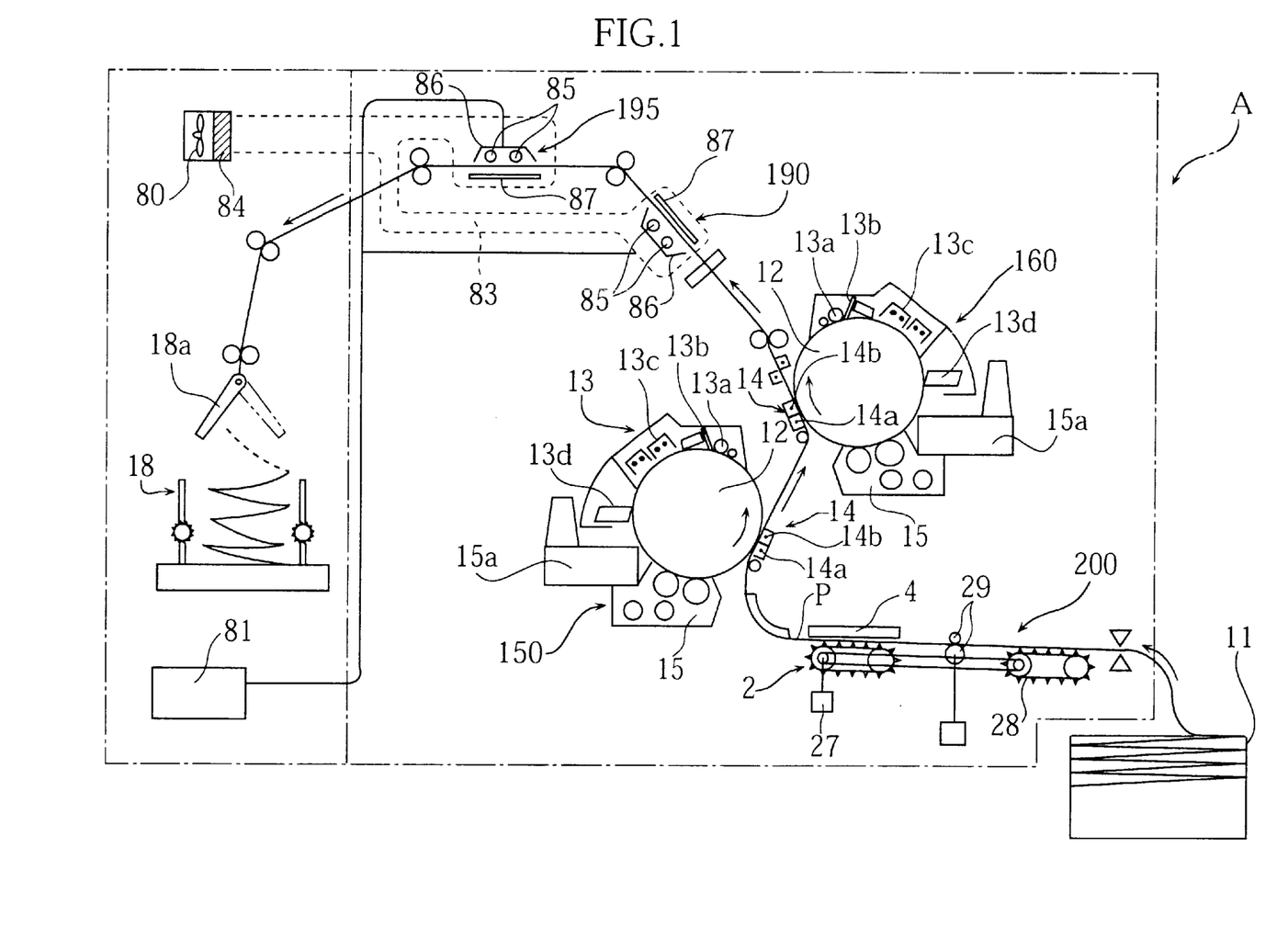
FIG. 1 illustrates the outline of a continuous paper treating apparatus (an electrophotographic printer) embodying the present invention.

FIG. 1 shows the principle components of a continuous paper treating apparatus according to the present invention. In the illustrated embodiment, the apparatus of the present invention is depicted as an electrophotographic printer, which is generally indicated by reference character A. It should be noted, however, that such a printer is only an exemplary form, and the present invention is not limited to this.

As seen from FIG. 1, the printer A is arranged to perform printing on both sides (i.e., obverse and reverse surfaces) of continuous paper P. The printer A includes a paper holder 11 for supplying the continuous paper P, a paper feeding mechanism 200, a first transfer unit (first image forming unit) 150, a second transfer unit (second image forming unit) 160, a first fixing unit 190, a second fixing unit 195, a paper stacker 18, a blower 80, and a power source 81 for the fixing units.

One of the most significant features of the illustrated printer A resides in tractors 2 included in the paper feeding mechanism 200. The other components of the printer A are basically similar in arrangement to those of the electrophotographic printer disclosed in Japanese Patent Application No. 11-33124 of the same applicant. The description of those similar components is incorporated herein by reference to this Japanese patent application.

Figure 2:
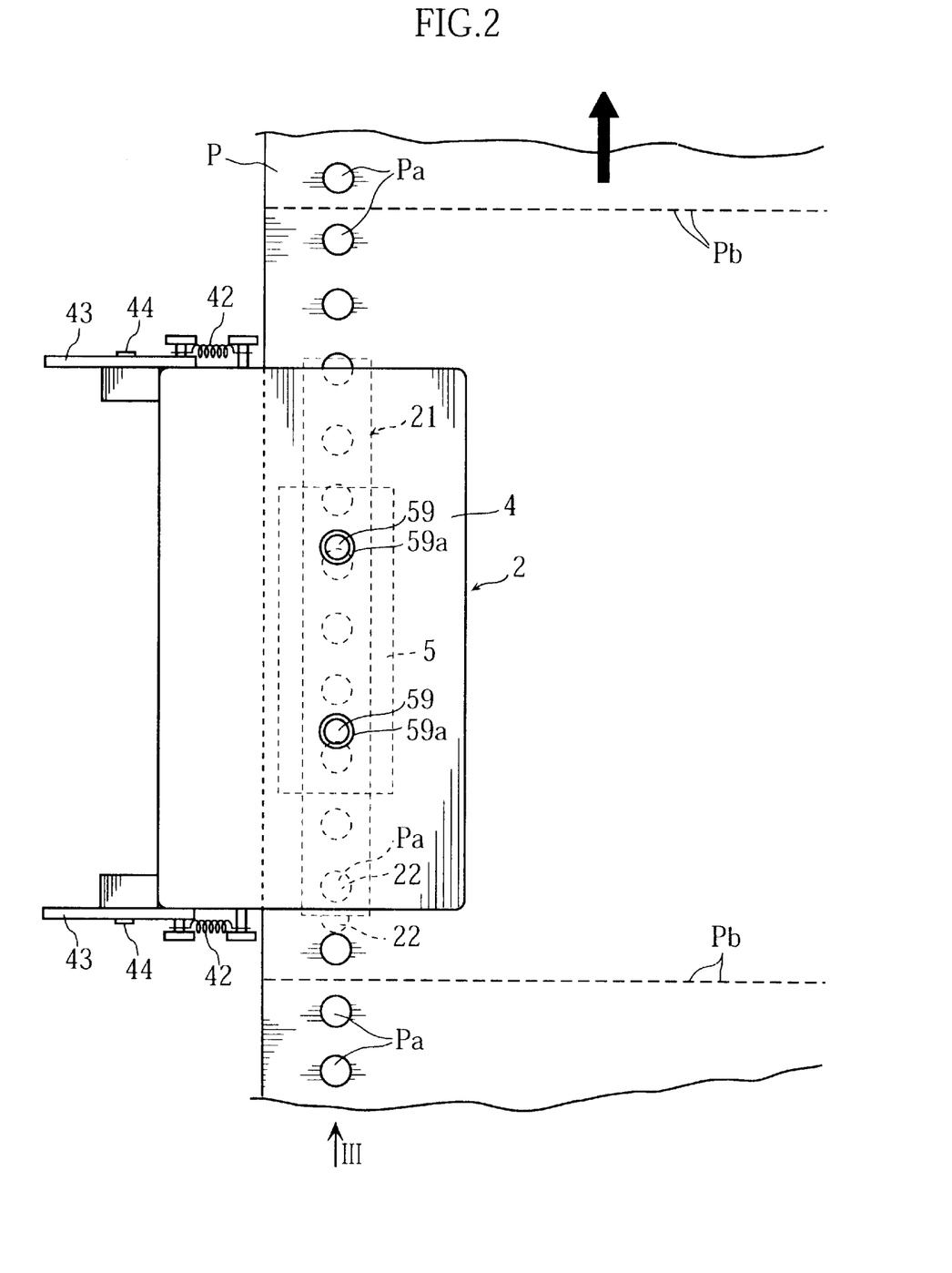
FIG 2 is a plan view showing principal portions of the printer of FIG. 1.

The paper holder 11 is provided for accommodating the continuous paper P to be used. As seen from FIG. 2, which illustrates part of the left edge of the paper P, a plurality of indexing holes Pa are formed along each longitudinal edge of the paper P. These indexing holes Pa are arranged in a single column extending longitudinally of the paper and disposed by a predetermined, constant pitch. The paper P is also provided with a plurality of perforation lines Pb. As shown in FIG. 2, the perforation lines Pb, each of which extends widthwise of the paper P, are arranged at regular intervals as viewed longitudinally of the paper P. As shown in FIG. 1, the continuous paper P, when accommodated in the paper holder 11, is alternately folded at the perforation lines Pb.

The paper feeding mechanism 200 is provided for feeding the paper P, which is paid out from the holder 11, to the first transfer unit 150 and further to the second transfer unit 160. The feeding mechanism 200 includes a pair of first tractors 2 and another pair of second tractors 28 arranged upstream of the paper transfer path from the first tractors 2. The feeding mechanism 200 also includes a pair of back-tension rollers 29 located between the first and the second tractors 2, 28.

As will be described later, the first tractors 2 have several features characteristic of the present invention. On the other hand, the second tractors 28 are ordinary tractors having conventionally known arrangements. Specifically, as shown in FIG. 1, each second tractor 28 is provided with a circularly-driven tractor belt. This tractor belt is formed with a plurality of tractor pins brought into engagement with the indexing holes Pa of the paper P. In the illustrated embodiment, the second tractors 28 differ in arrangement from the first tractors 2. Alternatively, however, the first and second tractors 2, 28 may have the same arrangements.

Though not shown, the first and the second tractors 2, 28 are provided with driving shafts which are mutually connected. Thus, in operation, the first and second tractors 2, 28 will be rotated in synchronism with one another by a common driving means (such as a motor) 27.

The paired back-tension rollers 29 are capable of exerting upstream tension (back-tension) on the paper P advancing toward the first transfer unit 150 where the paper P is subjected to printing. Because of this tension, the continuous paper P is prevented from becoming slack.

The first transfer unit 150 includes a photosensitive drum 12 and other components functioning with the drum 12 for forming toner images and transferring these toner images. Specifically, the photosensitive drum 12 is rotatable about a predetermined horizontal axis, and has a cylindrical surface (side surface) on which electrostatic latent images are formed by a latent image forming unit 13.

The latent image forming unit 13 is provided with a cleaning brush 13a for cleaning the surface of the photosensitive drum 12, a cleaning blade 13b, and a charging device 13c for electrically charging the surface of the drum 12. The latent image forming unit 13 is also provided with an LED light irradiator 13d for irradiating the surface of the drum 12 with light. In this manner, desired electrostatic latent images are formed on the surface of the drum 12 which has been electrically charged by the charging device 13c. The latent images are developed by a developer 15 provided with a toner hopper 15a, and turned to be visible toner images.

Then, these toner images are transferred onto e.g. the obverse surface of the paper P by a transfer charger 14 arranged in facing relation to the photosensitive drum 12. More specifically, the transfer charger 14 is provided with a transfer wire 14a adjacent to the cylindrical surface of the drum 12. To transfer the toner images from the drum surface to the paper P, a predetermined voltage is applied across the transfer wire 14a. This voltage has a polarity opposite to that of the toner images. Thus, the toner images formed on the drum surface are attracted toward the transfer wire 14a to settle on the obverse surface of the paper P.

In addition to the transfer wire 14a, the transfer charger 14 is also provided with a discharge wire 14b disposed downstream of the paper transfer path from the transfer wire 14a (see FIG. 1). The discharge wire 14b is arranged to discharge the paper P which has been charged for the above-mentioned transferring of the toner images.

The second transfer unit 160 is provided for performing printing on the reverse surface of the paper P which is opposite to the obverse surface treated by the first transfer unit 150. As shown in FIG. 1, the second transfer unit 160 is disposed downstream from the first transfer unit 150. Basically, the second transfer unit 160 is similar in arrangement to the first transfer unit 150 described above. Thus, components of the second transfer unit 160 which are like or similar to those of the first transfer unit 150 are referred to as the same reference signs, and no description about them is given here.

The first fixing unit 190 and the second fixing unit 195 are provided for fixing the toner images transferred onto the obverse and reverse surfaces of the continuous paper P. These fixing units 190, 195 are flash fixing devices, which are suitable for high-speed printing. Specifically, each of the fixing units 190, 195 includes flash lamps 85 driven by the power source 81, a reflection mirror 86, and an additional reflection member 87 disposed in facing relation to the reflection mirror 86. Both fixing units 190, 195 are connected to a duct 83 associated with the blower 80. With such an arrangement, it is possible to expel smoke which may be generated at the fixing units 190, 195 during a toner image transferring operation. As illustrated, a filter 84 is attached to the exit end of the duct 83. Thus, the smoke originating from the first and/or the second fixing units 190, 195 is properly treated by the filter 84 before being expelled.

The paper stacker 18 is provided for receiving the continuous paper P after the transferred toner images are fixed to the paper. Above the paper stacker 18, a swing guide 18a, which comes into contact with the paper P, is provided for causing the paper P to be neatly accommodated in the stacker 18. Specifically, as shown in FIG. 1, the swing guide 18a is pivotable about a horizontal axis between a first position depicted in solid lines and a second position depicted in broken lines. In this manner, the swing guide 18a causes the continuous paper P to be alternately folded at the perforation lines Pb (FIG. 2). As a result, the treated continuous paper P will be neatly stacked in the stacker 18.

Next, the structure of the tractors 2 will be described below.

Figure 5:
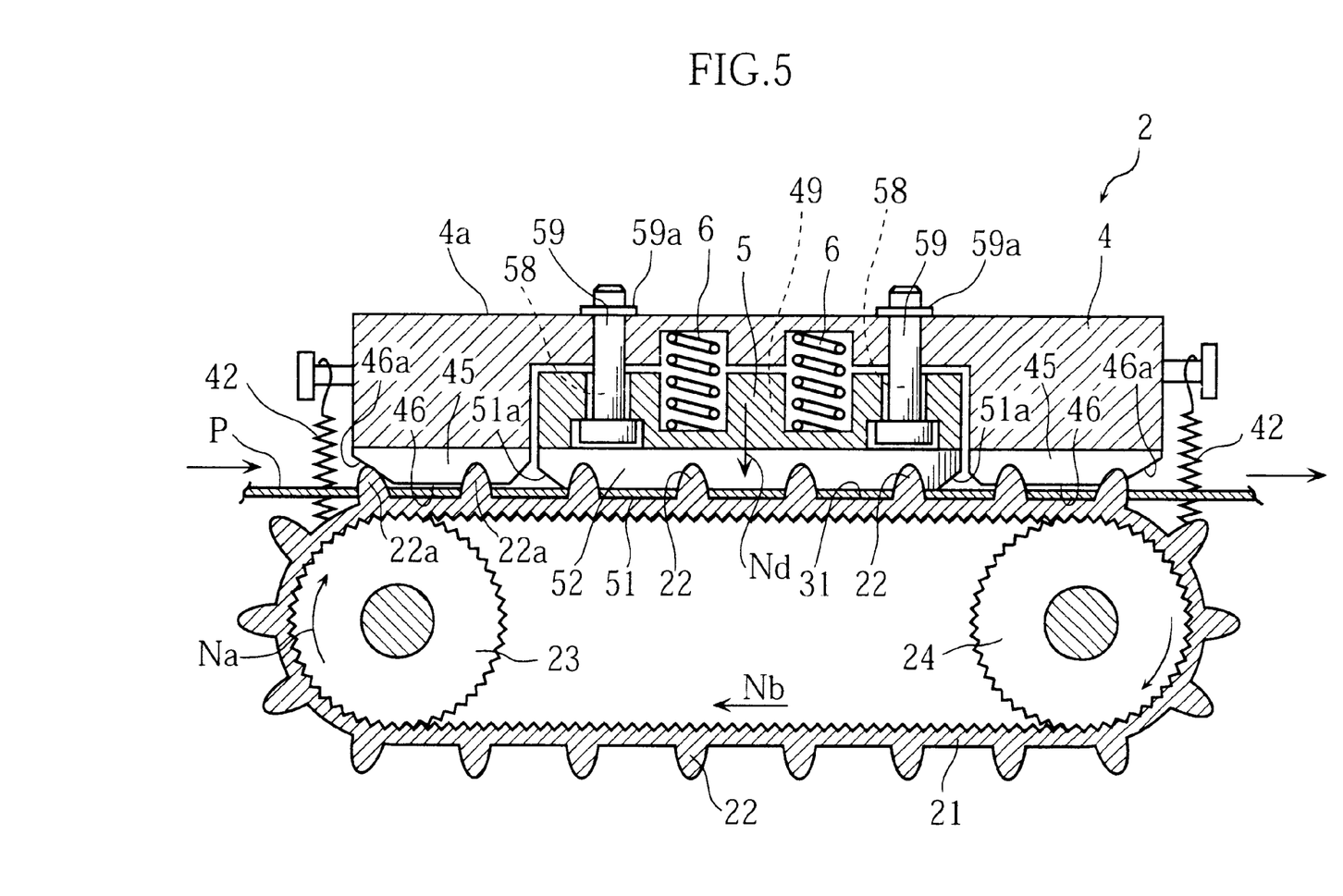
FIG. 5 is a sectional view taken along lines V—V in FIG. 3.
Figure 6:
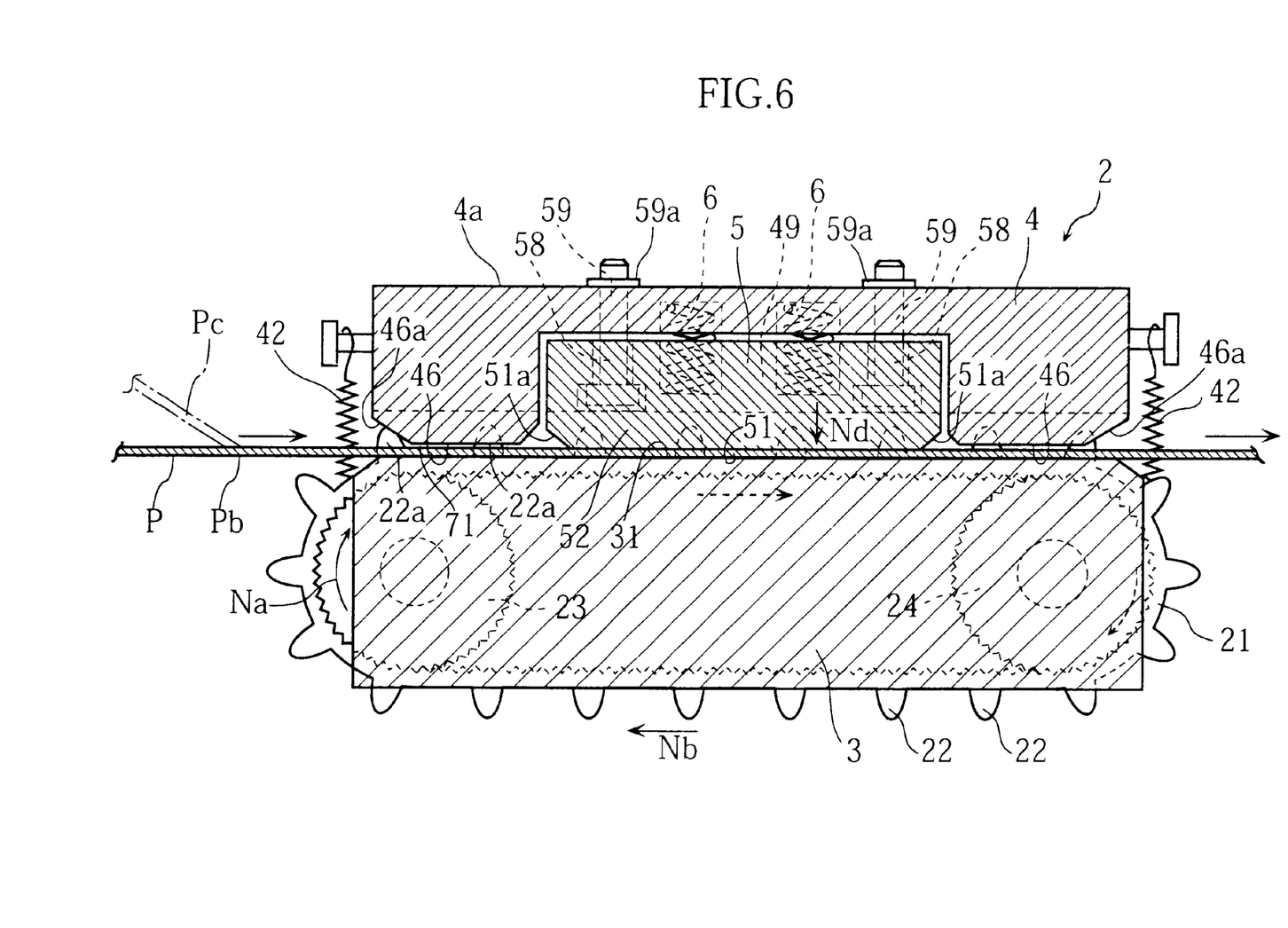
FIG. 6 is a sectional view taken along lines VI—VI in FIG. 3.

The first tractors 2 are composed of paired devices (i.e., right and left tractors) spaced from each other widthwise of the paper P. Each of the first tractors 2 is arranged adjacent to a corresponding one of the longitudinal edges of the paper P, as shown in FIG. 2. (In FIG. 2, only the left tractor 2 is shown.) The two tractors 2 are adjustable in position relative to each other. (In other words, the distance between the tractors 2 is adjustable.) Thus, even if the currently used paper P is replaced with another continuous paper of a different width, the printer A of the present invention can cope with the new paper by adjusting the positions of the tractors 2. As shown in FIGS. 5 and 6, each tractor 2 includes a support base 3, a tractor belt 21, a tractor lid 4, a presser member 5, a plurality of springs 6 and other components described later.

Figure 3:
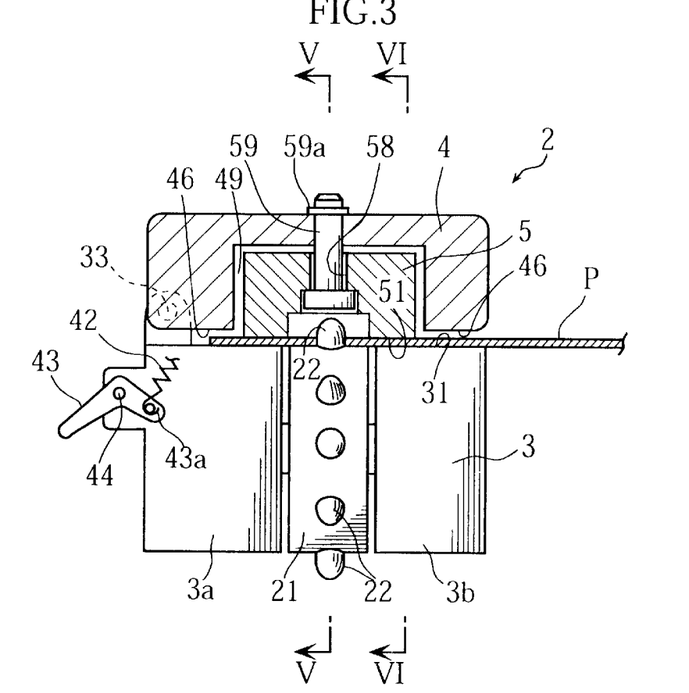
FIG. 3 is a side view, partly in section, as viewed in the direction of an arrow III in FIG. 2.

The main purpose of the support base 3 is to serve as a chassis for supporting the tractor belt 21, the tractor lid and other components. As shown in FIG. 3, the support base 3 includes a pair of right and left members 3a, 3b between which the tractor belt 21 is disposed. The support base 3 is provided with a flat, upper surface 31 for supporting the continuous paper P. More specifically, the paper supporting surface 31 is made up of the upper surfaces of the respective members 3a, 3b which are flush with each other. Referring to FIG. 6, the paper supporting surface 31 is generally the same in length as the tractor belt 21, as viewed in the paper transfer direction. The support base 3 may be made of stainless steel, and the paper supporting surface 31 is rendered highly resistant to wear. Preferably, the Vickers hardness of the paper supporting surface 31 may be no less than 800, so that the surface 31 is well protected from frictional damage and withstands long use.

As shown in FIGS. 5 and 6, the tractor belt 21 is endless, and provided with a plurality of tractor pins 22 protruding outward of the belt 21. The tractor pins 22 are spaced from each other by a constant pitch corresponding to that of the indexing holes Pa of the continuous paper P. The tractor belt 21 extends around front and rear pulleys 23, 24 supported by the support base 3. Each pulley is connected to a horizontal shaft. In operation, the shaft of the front pulley 23, for example, is rotated in the direction of an arrow Na by the driving means 27. Preferably, each of the pulleys 23, 24 is outwardly formed with plural teeth for preventing slip of the tractor belt 21. Accordingly, the tractor belt 21 is inwardly formed with plural teeth coming into engagement with the teeth of the pulleys 23, 24.

With such an arrangement, in response to the rotation of the front pulley 23, the tractor belt 21 is driven as shown by an arrow Nb at a predetermined speed. The tractor belt 21 is operated in synchronism with the photosensitive drums 12 of the first and second transfer units 150, 160. The transferring (feeding) speed of the tractor belt 21 for the paper P is slightly slower than that of the respective drums 12 (for example, the former is slower than the latter by 0.1%). In this manner, the continuous paper P is suitably tensioned between the drum 12 of the first transfer unit 150 and the tractors 2, so that the toner image transfer onto the paper P is properly performed.

Figure 4:
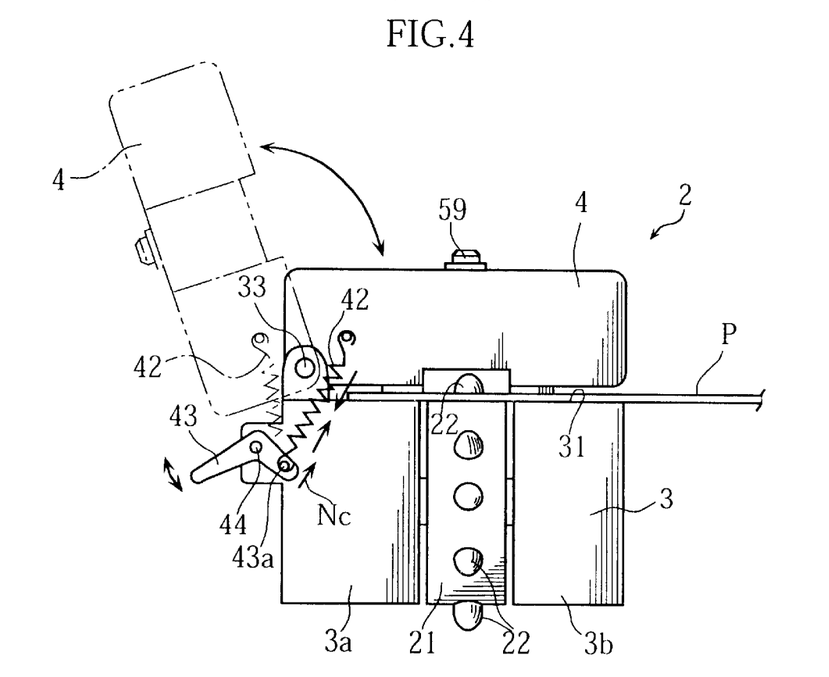
FIG. 4 is a side view showing the open-close behavior of the tractor lid.

The tractor lid 4 may be made of a synthetic resin and has a generally rectangular configuration extending longitudinally of the tractor belt 21. As shown in FIGS. 3 and 4, the tractor lid 4 is attached to the support base 3 via a shaft 33. The tractor lid 4 is pivotable about the shaft 33 to be movable between a closed position (shown by solid lines in FIG. 4) and an open position (shown by single-dot chain lines in FIG. 4). In the closed position, the tractor lid 4 is located immediately above the support base 3 and the tractor belt 21 for covering these components. In the open position, the tractor lid 4 allows the support base 3 and the tractor belt 21 to be exposed upward.

As shown in FIG. 4, the upper end of a spring 42 is connected to the tractor lid 4, while the lower end of the spring 42 is connected to an end portion 43a of a lever 43 carried by the support base 3. The spring 42 is one of the components included in a toggle mechanism adopted for selectively keeping the tractor lid 4 in the above-mentioned open and closed positions. Specifically, when the tractor lid 4 is brought to the closed position, the spring 42 urges the lid 4 downward toward the paper supporting surface 31 and the tractor belt 21. On the other hand, when the tractor lid 4 is brought to the open position, the spring 42 urges the lid 4 away from the paper supporting surface 31 (counterclockwise in FIG. 4). In either position, the tractor lid 4 is kept stable in place because of the restoring force of the spring 42.

The lever 43 is rotatable about a supporting shaft 44 and can be stopped at any selected position within a predetermined range. Thus, by operating the lever 43, it is possible to vary the length of the spring 43, thereby adjusting the urging force of the spring 42. Specifically, supposing that the tractor lid 4 is in the closed position (solid lines in FIG. 4), the expansion of the spring 42 will be reduced by turning the end portion 43a of the lever 43 in the Nc-direction. As a result, the urging force of the spring 42 pulling down the lid 4 will become weaker. On the other hand, when the end portion 43a of the lever 43 is turned oppositely to the Nc-direction, the expansion of the spring 42 is increased, thereby pulling down the tractor lid 4 more strongly.

Referring to FIGS. 5 and 6, the tractor lid 4 is provided with a guide surface 46, and a groove 45 for avoiding interference with the tractor pins 22. When the lid 4 is in the closed position, as illustrated, the guide surface 46 and the groove 45 are held in facing relation to the paper supporting surface 31. The tractor lid 4 is also provided with a downwardly open, retreated portion 49 for receiving the presser member 5. The retreated portion 49 is located in a longitudinal center of the lid 4. As readily understood, the above-mentioned guide surface 46 and the groove 45 are not formed at the retreated portion 49. The longitudinal ends of the tractor lid 4 are chamfered to provide inclined portions 46a connected to the guide surface 46. Instead of being flat, the inclined portions 46a may be a smoothly curved, round surface.

The presser member 5 has a generally rectangular configuration extending longitudinally of the tractor lid 4 (see FIG. 2). The presser member 5 is fitted into the retreated portion 49 of the lid 4, and supported by the lid 4 via a plurality of pins 59. Specifically, the pins 59 extend through the thickness of the tractor lid 4. Each pin 59 has an upper portion to which a stopper 59a such as a snap ring is fixed, and the stopper 59a is held in engagement with the upper surface 4a of the tractor lid 4. In this manner, each pin 59 is prevented from being extracted downward from the tractor lid 4.

The presser member 5 is formed with a plurality of through holes 58 (two holes in the illustrated embodiment) into which the pins 59 are inserted. Each pin 59 is formed, at its lower end, with an enlarged portion which is diametrically larger than the through hole 58. With such an arrangement, the pins 59, at their lower ends, come into engagement with the presser member 5, thereby suspending the presser member 5. Further, as shown in FIG. 5, the presser member 5 is made smaller in size than the retreated portion 49 of the tractor lid 4, so that a clearance is present between the presser member 5 and the tractor lid 4. Thus, the presser member 5 can be displaced axially of the pins 59 within the retreated portion 49. Further, the through holes 58 are made diametrically larger than the pins 59. Thus, within the retreated portion 49, the presser member 5 can be inclined in various directions. In short, the position and posture of the presser member 5 are variable relative to the tractor lid 4.

The presser member 5 has a pressing surface 51. As shown in FIG. 6 for example, the pressing surface 51 is brought into facing relation to the paper supporting surface 31 of the base 3 when the tractor lid 4 is closed. Like the support base 3, the presser member 5 may be made of stainless steel, and the pressing surface 51 may be an excellent wear-resistant surface. Preferably, the Vickers hardness of the pressing surface 51 may be no less than 800, as in the paper supporting surface 31.

As will be described later, the pressing surface 51 needs to be capable of exerting a certain frictional force on the paper P. Thus, preferably, the pressing surface 51 may be an uneven surface provided with tiny protrusions and/or plural grooves. Of course, it is also possible to render the pressing surface 51 to be a flat, smooth surface. Such an arrangement holds for the paper supporting surface 31 of the support base 3.

The presser member 5 is chamfered at its longitudinal ends, thereby forming inclined portions 51a connected to the pressing surface 51. The presser member 5 is formed with a groove 52. Thus, as in the tractor lid 4, the presser member 5 is prevented from interfering with the tractor pins 22 when the tractor lid 4 is closed. As will be described later, use is made of plural springs 6 for urging the presser member 5 to press the paper P.

The tractor belt 21 is arranged so that a portion of the belt is located upstream (in FIGS. 5 and 6, to the left) of the paper transfer path from the presser member 5. This portion of the belt 21 is long enough to allow at least two tractor pins 22 (22a) being held upright to be located upstream of the path from the presser member 5. In other words, the upstream portion of the belt 21 needs to be longer than the pitch (one pitch) of the tractor pins 22.

The above-mentioned springs 6 for urging the presser member 5 may be compression springs (coil springs), though the present invention is not limited to this. In place of the compression springs, use may be made of various kinds of elastic elements such as other types of springs (leaf springs for example), rubber members, and so forth.

As best shown in FIG. 5, the springs 6 are arranged between the tractor lid 4 and the presser member 5. For positioning the springs 6, the lid 4 and the presser member 5 are formed with plural pairs of bores in which the springs 6 are received. With such an arrangement, the presser member 5 is urged downward or in the direction shown by an arrow Nd. In this manner, when the tractor lid 4 is closed, the pressing surface 51 of the presser member 5 is pressed toward the paper supporting surface 31.

Figure 7:
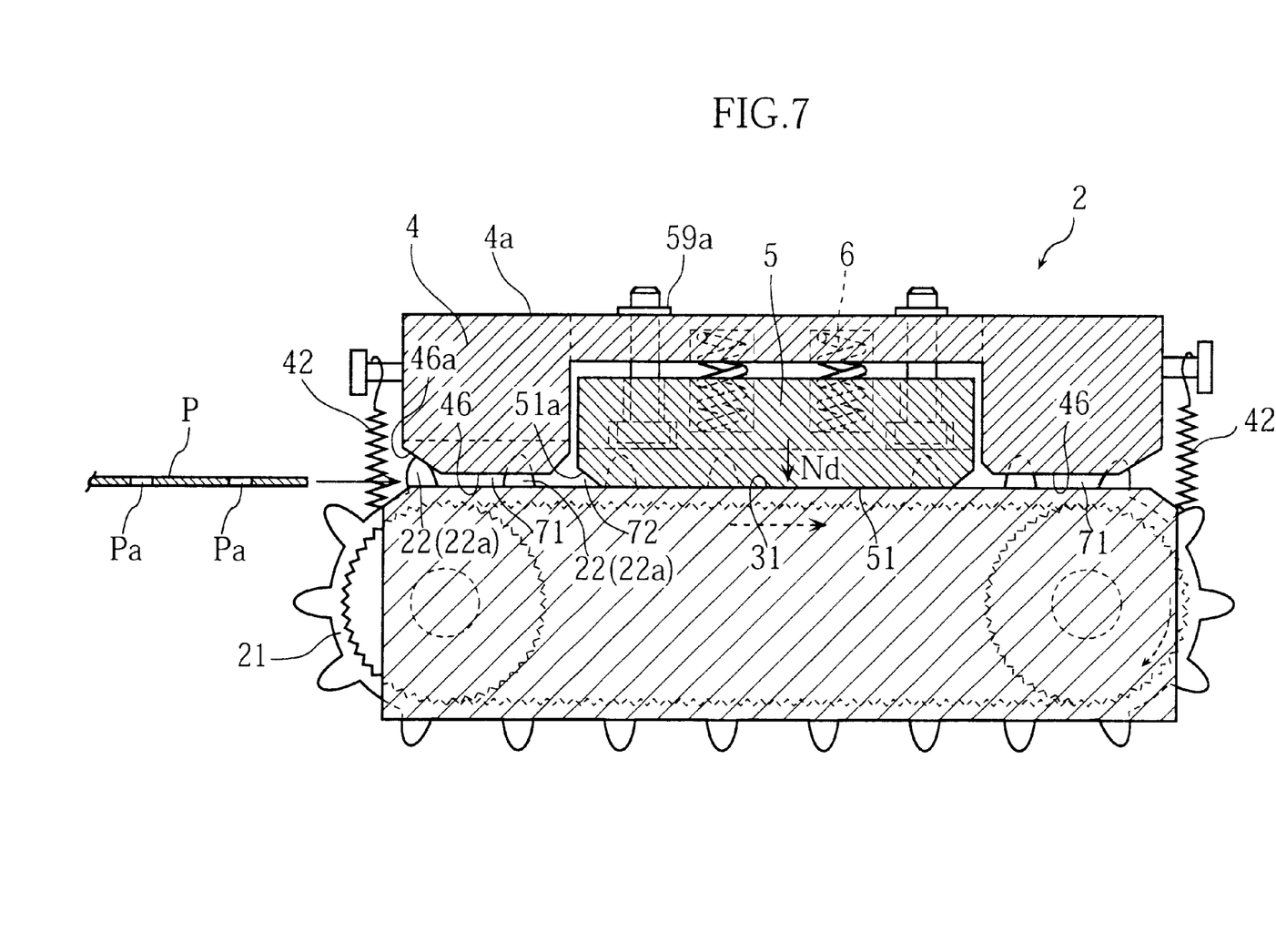
FIG. 7 is a sectional view showing the tractor with the continuous paper to be inserted.

The urging force of the springs 6 (the force working in the Nd-direction) is rendered greater than the total of the downward force of the springs 42 (pulling down the lid 4) and the weight of the lid 4. Therefore, when the tractor lid 4 is closed to bring the pressing surface 51 of the presser member 5 into contact with the paper supporting surface 31, the tractor lid 4 is raised relative to the presser member 5 by the springs 6. In this condition, as shown in FIG. 7, a clearance 71 is provided between the guide surface 46 of the lid 4 and the paper supporting surface 31. The clearance 71 is greater in thickness than the continuous paper P.

Next, the operations of the printer A and tractors 2 will be described below.

First, the tractor lid 4 is opened, as indicated by the single-dot chain lines in FIG. 4, so that the continuous paper P is brought into engagement with the tractors 2. Specifically, the paper P is manually engaged with the tractors 2 by causing the indexing holes Pa of the paper P to be caught by the tractor pins 22. Then, the tractor lid 4 is manually closed, as depicted by the solid lines in FIG. 4.

Alternatively, however, it is also possible to cause the paper P to be engaged with the tractors 2 with the tractor lid 4 being closed. As described above with reference to FIG. 7, the clearance 71 is present between the guide surface 46 of the lid 4 and the paper supporting surface 31, and this clearance is greater in thickness than the paper P. Further, the upstream opening of the clearance 71 (i.e., the left extremity of the clearance 71 in FIG. 7) is made wider because of the inclined portion 46a. Thus, the paper P can be easily inserted into the clearance 71.

Thereafter, at least two indexing holes Pa (at each edge) of the paper is caused to come into engagement with the tractor pins 22 (22a) of the tractor belt 21. In this manner, the paper P is reliably caught by the tractor pins 22. Then, the tractor belt 21 is actuated for auto loading of the paper P, thereby advancing the paper P through the entire length of the tractors 2 (and even further along the paper transfer path). As shown in FIG. 7, the pressing surface 51 of the presser member 5 is initially held in contact with the paper supporting surface 31, thereby residing in the way of the paper transfer path. It should be noted, however, that the upstream corner of the pressing surface 51 is chamfered to provide the inclined portion 51a defining a paper inlet opening 72. With such an arrangement, the leading edge (front edge) of the paper P will be smoothly introduced between the pressing surface 51 and the paper supporting surface 31.

The printer A may be actuated for performing desired printing after the continuous paper P is fed through the entire length of the paper transfer path, as shown in FIG. 1. In operation of the printer A, the respective photosensitive drums 12 are rotated in synchronism with the tractor belts 21 of the tractors 2. At this stage, the photosensitive drums 12 tend to exert unfavorable pulling force on the paper P in the same manner as described with reference to FIG. 8.

According to the above embodiment of the present invention, however, the paper P is pressed against the paper supporting surface 31 by the presser member 5 of the tractor 2 (see FIGS. 3–6). In this way, a suitable frictional force is applied to the paper P. Here, it should be appreciated that the frictional force does not work to restrict the paper-feeding operation of the tractors 2, but serves only to counterbalance the unfavorable pulling force exerted on the paper P by the drums 12. With such an arrangement, the pulling force of the drums 12 will be cancelled out by the frictional force generated at the tractors 2. Consequently, the continuous paper P is advantageously prevented from being torn at the indexing holes Pa in engagement with the tractor pins 22.

As previously stated, the presser member 5 is changeable in position and posture relative to the tractor lid 4. Thus, when the presser member 5 is pressed against the paper P by the urging force of the springs 6, the presser member 5 adjusts itself to become parallel to the paper P to come into full contact with the paper P. In this manner, the presser member 5 uniformly presses the paper P via its pressing surface 51, thereby reliably applying the frictional force to the paper P. As a result, the paper feeding operation at the tractors 2 is properly performed.

Further, according to the illustrated embodiment, the paper P is guided to advance between the pressing surface 51 and the paper supporting surface 31. Therefore, even if the paper P deviates from the predetermined transfer path at locations upstream or downstream from the tractors 2, the paper P will not unduly come off the tractors 2. The guide surface 46 of the tractor lid 4 also prevents the paper P from improperly coming off the tractors 2, though the guide surface 46 is not arranged to press the paper P onto the paper supporting surface 31.

Referring to FIG. 6, the transferred paper P may be bent at a perforation line Pb to provide a bent portion Pc, as shown by single-dot chain lines in the figure. In such an instance, the bent portion Pc is forced into the clearance 71 of the tractor 2. According to the preferred embodiment, however, the tractor lid 4 can be raised more easily (i.e., with a smaller force) than the presser member 5. Thus, when the bent portion Pc is led into the clearance 71, the tractor lid 4 is lifted by the bent portion Pc. Consequently, the clearance 71 is advantageously made greater in size, thereby preventing the paper P from being stuck in the clearance 71. As advancing through the clearance 71, the bent portion Pc is gradually rendered flatter. Thus, the bent portion Pc can be moved smoothly between the presser member 5 and the paper supporting surface 31.

With the illustrated arrangement, the pressing surface 51 of the presser member 5 is held substantially in full contact with the paper P, while the tractor lid 4 is lifted up by the bent portion Pc. Thus, desired frictional force is properly applied to the paper P, while the paper P is advantageously prevented from unduly coming off the tractors 2.

When the pressing force to be applied to the paper P by the presser member 5 is smaller than the force to be applied to the presser member 5 by the paper P, the presser member 5 is raised, as in the tractor lid 4. Thus, the paper P is also prevented from being stuck at the presser member 5. The upward movement of the presser member 5 may be accompanied by compression of the springs 6. In the illustrated tractor 2, however, not only the presser member 5 but also the tractor lid 4 is raised. Accordingly, the springs 6 are compressed to a smaller extent than when the tractor lid 4 is not displaced. Thus, the pressing force of the presser member 5 is prevented from increasing sharply, which is advantageous in applying a constant pressing force to the paper P.

The pressing force of the presser member 5 acting on the paper P is partly due to the urging force of the springs 42 connected to the tractor lid 4. As previously described with reference to FIG. 4, the urging force of the spring 42 is adjustable by operating the lever 43 of the tractor 2. Thus, the pressing force of the presser member 5 is adjustable by the lever 43.

With the above arrangement, it is possible to change the pressing force of the presser member 5 in accordance with e.g. the thickness of the continuous paper P. In this manner, breakage at the indexing holes Pa of the paper P is more effectively prevented. Of course, the pressing force of the presser member 5 can be adjusted in other ways. For instance, use may be made of a set of weights differing in mass, and a selected one or more of them may be put on the tractor lid 4. The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. A continuous paper treating apparatus comprising:
    a tractor including a rotatable driving member provided with a plurality of tractor pins, the tractor also including a tractor lid for covering the driving member; and
    treating means for treating continuous paper transferred along a predetermined path by the tractor;
    wherein the tractor further includes a support member having a paper support surface for supporting the continuous paper, the tractor further including a presser member supported by the tractor lid, the presser member being variable in position and posture relative to the tractor lid, the presser member having a flat pressing surface for slidable contact with the continuous paper, the tractor further including urging means for urging the presser member toward the paper supporting surface so as to cause the pressing surface to press the continuous paper onto the paper supporting surface; and wherein further
        the tractor lid is movable to be selectively brought into facing relation to the paper supporting surface, the tractor lid being urged toward the paper supporting surface with a first urging force, the presser member being urged toward the paper supporting surface with a second urging force which is greater than the first urging force.

2. The apparatus according to claim 1, wherein the urging means comprises an elastic member.

3. The apparatus according to claim 2, wherein the elastic member comprises a spring.

4. The apparatus according to claim 1, wherein the tractor lid is movable into facing relation to the paper supporting surface, said facing relation causing the tractor lid and the paper supporting surface to define a clearance when the continuous paper is unsupported by the paper supporting surface.

5. The apparatus according to claim 1, wherein the driving member comprises a tractor belt from which the tractor pins protrude, at least two of the tractor pins being present upstream of the predetermined path from the presser member.

6. The apparatus according to claim 1, wherein the presser member is provided with a chamfered portion defining a paper inlet opening for inserting the continuous paper between the pressing surface and the paper supporting surface.

7. The apparatus according to claim 1, wherein the tractor lid is provided with a retreated portion which is open toward the support member for loosely accommodating the presser member, the presser member being movable relative to the tractor lid within the retreated portion.

8. The apparatus according to claim 7, wherein the presser member is supported by the tractor lid via a least one pin mounted on the tractor lid, the presser member being provided with at least one through-hole in which said a least one pin is loosely fitted.

9. A tractor for transferring continuous paper comprising:
    a rotatable driving member provided with a plurality of tractor pins;
    a tractor lid for covering the driving member;
    a support member having a paper support surface for supporting the continuous paper;
    a presser member supported by the tractor lid; the presser member being variable in position and posture relative to the tractor lid, the presser member having a flat pressing surface for slidable contact with the continuous paper; and
    urging means for urging the presser member toward the paper supporting surface so as to cause the pressing surface to press the continuous paper onto the paper supporting surface, wherein the tractor lid is movable to be selectively brought into facing relation to the paper supporting surface, the tractor lid being urged toward the paper supporting surface with a first urging force, and the presser member being urged toward the paper supporting surface with a second urging force which is greater than the first urging force.

10. That apparatus according to claim 9, wherien the tractor lid is provided with a retreated portion which is open toward the support member for loosely accommodating the presser member, the presser member being movable relative to the tractor lid within the retreated portion.

11. The apparatus according to claim 10, wherein the presser member is supported by the tractor lid via at least one pin mounted on the tractor lid, the presser member being provided with at least one through-hole in which said at least one pin is loosely fitted.

* * * * *